(12) United States Patent
Trossen et al.

(10) Patent No.: US 7,908,378 B2
(45) Date of Patent: Mar. 15, 2011

(54) PROVISIONING SEAMLESS APPLICATIONS IN MOBILE TERMINALS THROUGH REGISTERING AND TRANSFERRING OF APPLICATION CONTEXT

(75) Inventors: Dirk Trossen, Cambridge, MA (US); Hemant Chaskar, Woburn, MA (US)

(73) Assignee: Nokia, Inc., Irving, TX (US)

( * ) Notice: Subject to any disclaimer, the term of this patent is extended or adjusted under 35 U.S.C. 154(b) by 2673 days.

(21) Appl. No.: 10/137,340

(22) Filed: May 3, 2002

(65) Prior Publication Data
US 2003/0204599 A1 Oct. 30, 2003

Related U.S. Application Data

(60) Provisional application No. 60/375,414, filed on Apr. 26, 2002.

(51) Int. Cl.
*G06F 15/16* (2006.01)
(52) U.S. Cl. .................. 709/227; 709/246; 709/249
(58) Field of Classification Search .......... 709/227–229, 709/246–249; 719/318; 379/219; 370/338, 370/355; 455/432.1–433, 436–439
See application file for complete search history.

(56) References Cited

U.S. PATENT DOCUMENTS

| | | | |
|---|---|---|---|
| 5,724,346 A | 3/1998 | Kobayashi et al. | |
| 5,796,727 A * | 8/1998 | Harrison et al. | 370/338 |
| 5,875,186 A | 2/1999 | Belanger et al. | |
| 6,160,804 A | 12/2000 | Ahmed et al. | |
| 6,366,561 B1 | 4/2002 | Bender | |
| 6,477,149 B1 | 11/2002 | Okanoue | |
| 6,662,012 B1 * | 12/2003 | Do | 455/433 |
| 6,769,000 B1 * | 7/2004 | Akhtar et al. | 707/103 R |
| 7,161,914 B2 * | 1/2007 | Shoaib et al. | 370/331 |
| 7,388,851 B2 * | 6/2008 | Trossen | 370/331 |
| 2002/0021696 A1 * | 2/2002 | Minborg | 370/392 |
| 2002/0085528 A1 * | 7/2002 | Reza et al. | 370/338 |
| 2002/0085719 A1 * | 7/2002 | Crosbie | 380/248 |

(Continued)

FOREIGN PATENT DOCUMENTS

EP 1126716 A1 8/2001

(Continued)

OTHER PUBLICATIONS

Robert Bleidt, MPEG-4:A System Designer's View, Nov. 12, 2001, EE Times, pp. 1-4.*

(Continued)

*Primary Examiner* — William C. Vaughn, Jr.
*Assistant Examiner* — Greg Bengzon
(74) *Attorney, Agent, or Firm* — Banner & Witcoff, Ltd.

(57) ABSTRACT

Service provisioning in mobile terminals is provided through registering and transferring of application context, which permits substantially seamless transfer of application functionality across administrative service domains. An architecture for providing application context transfer may include access routers, transcoder proxy servers, and gateway routers. A mobile terminal served by a current access router creates an application context for a session and registers it with the current access router. Around the time of handoff, the current access router transfers the application context to a new access router associated with a new administrative domain and a new access network. The new access router evaluates the application context and takes steps to provide application functionality for the mobile terminal and current sessions. These steps may include the use of a network entity, such as a transcoder proxy server, to modify data for a session and thereby provide application functionality in the new administrative domain.

20 Claims, 7 Drawing Sheets

U.S. PATENT DOCUMENTS

| | | | |
|---|---|---|---|
| 2002/0098840 A1* | 7/2002 | Hanson et al. | 455/435 |
| 2002/0152267 A1* | 10/2002 | Lennon | 709/203 |
| 2002/0167965 A1* | 11/2002 | Beasley et al. | 370/465 |
| 2003/0137947 A1* | 7/2003 | Roy et al. | 370/310 |
| 2004/0196808 A1* | 10/2004 | Chaskar et al. | 370/331 |
| 2006/0291455 A1* | 12/2006 | Katz et al. | 370/355 |

FOREIGN PATENT DOCUMENTS

| | | |
|---|---|---|
| EP | 1189405 A1 | 3/2002 |
| WO | WO99/48310 | 9/1999 |
| WO | WO02/13077 A2 | 2/2002 |

OTHER PUBLICATIONS

'Terminal Independent Mobility for IP', IEEE Communications Magazine, Dec. 2001, Grilo, Estrela, Nunes.*

U.S. Appl. No. 60/382,093, filed Mar. 7, 2002, Krishnamurthi et al.

U.S. Appl. No. 10/144,281, filed May 10, 2002, Trossen et al.

U.S. Appl. No. 10/144,279, filed May 10, 2002, Trossen et al.

Calhoun et al, Low Latency Handoffs In Mobile IPv4 , Internet Draft, <draft-ietf-mobileip-lowlatency-handoffs-v4-04.txt>, Jun. 2002.

Koodli et al, Context Relocation For Seamless Header Compression In IP Networks, Internet Draft, <draft-koodli-seamoby-hc-relocate-01.txt>, Jul. 2001.

Westphal et al, Context Relocation Of QoS Parameters In IP Networks, Internet Draft, <draft-westphal-seamoby-qos-relocate-00.txt>, Jul. 2001.

Johnson et al, Mobility Support In [Pv6, Internet Draft, <draft-ietf-mobileip-ipv6-15.txt>, Jul. 2001.

Levkowetz et al, Reasons For Performing Context Transfers Between Nodes In An IP Access Network, Internet Draft, <draft-ietf-seamoby-context-transfer-problem-stat-04.txt>, May 2002.

Syed et al, General Requirements For A Context Transfer Framework, Internet Draft, <draft-ietf-seamoby-ct-reqs-00.txt>, May 2001.

Syed et al, QoS (DIFFSERV) Context Transfer, Internet Draft, <draft-hamid-seamoby-ct-qos-context-00.txt>, Jun. 2001.

Koodli et al, A Context Transfer Framework For Seamless Mobility, Internet Draft, <draft-koodli-seamoby-ctv6-01.txt>, Jul. 2001.

Yegin et al, Fast Handovers For Mobile IPv6, Internet Draft, <draft-ieft-mobilelp-fast-mipv6-04.txt>, Mar. 2002.

Hamer et al, Issues In IPSec Context Transfer, Internet Draft, <gopal-seamoby-ipsecctxt-issues-01.txt, Feb. 2002.

Krishnamurthi et al, Requirements For Car Discovery Protocols, Internet Draft, <draft-krishnamurthi-seamoby-car-requirements-01.txt>, Jan. 2002.

IP Mobility Support, C. Perkins, Ed., Network Working Group, RFC 2002, Oct. 1996.

Jiang et al., "Seamless Mobility Management Based on Proxy Servers", Wireless Communications and Networking Conference, Mar. 2002, vol. 2, pp. 563-568.

Trossen et al., "Issues in Candidate Access Router Discovery For Seamless IP-Level Handoffs", draft-ietf- seamoby-cardiscovery-issues-02.html, Jan. 2002, pp. 1-12.

Calhoun et al., "Low Latency Handoffs In Mobile Ipv4", draft-ietf-mobileip-lowlatency-handoffs-v4-04.txt, Dec. 2002, pp. 1-53.

Koodli et al., "Context Relocation For Seamless Header Compression In IP Networks", draft-koodli-seamoby-hc-relocate-01.txt, Jul. 2001, pp. 1-20.

Westphas et al., "Context Relocation of QoS Parameters In IP Networks", draft-westphal-seamoby-qos-relocate-00.txt, Jul. 2001, pp. 1-20.

Hamid et al, "QoS (DiffServ) Context Transfer", draft-hamid-seamoby-ct-qos-context-00.txt, Jun. 2001, pp. 1-8.

Koodli et al., "A Context Transfer Framework For Seamless Mobiilty", draft-kooli-seamoby-ctv6-01.txt, Jul. 2001, pp. 1-21.

"Problem Description: Reasons For Performing Context Transfers Between Nodes In An IP Access Network", draft-ietf-seamoby-context-transfer-problem-stat-04.txt, May 2002, pp. 1-12.

Yegin et al., "Fast Handovers For Mobile Ipv6"; draft -ietf-mobileip-fast-mipv6-02.txt, Sep. 2002, pp. 1-6.

Johnson et al., "Mobility Support in Ipv6", draft-ietf-mobileip-ipv6-15.txt. Jul. 2001, pp. 1-23.

Syed et al., "General Requirements For A Context Transfer Framework", draft-ietf-seamoby-ct-reqs-00.html, dated May 2001, pp. 1-9. +."IP Mobility Support", www.ietf.org/rfc/rfc2002.text, Oct. 1996; pp. 1-74.

Hamer et al., "Issues in IPSec Contect Transfer"; draft-gopal-seamoby-ipsecctxt-issues-01.txt, Feb. 2002, p. 1-16.

Krishnamurthi, "Requirements For CAR Discovery Protocols", draft-krishnamurthi-seamoby-car-requirements-01.txt, Jan. 2002, pp. 1-6.

"Requirements for Layer 2 Protocols to Support Optimized Handover for IP Mobility" Kempf et al. IEDTF Standard-Working-Draft, Internet Engineering Task Force, IETF, CH, Jul. 2001, XP015032071 ISSN: 0000-0004.

"Seamless Mobility Management Based on Proxy Servers" Jiang et al. Wireless Communications and Networking Conference 2002, US, vol. 2, Mar. 17, 2002, pp. 563-568.

Search Report from European Patent Office dated Jan. 22, 2008 from EP 1189405A1.

* cited by examiner

PROVISIONING SEAMLESS APPLICATIONS IN MOBILE TERMINALS THROUGH REGISTERING AND TRANSFERRING OF APPLICATION CONTEXT

This application is a nonprovisional application claiming priority to provisional application Ser. No. 60/375,414, filed on Apr. 26, 2002, the contents of which is incorporated by reference herein.

FIELD OF THE INVENTION

This invention relates generally to telecommunications networks. More particularly, the invention concerns systems and methods for enabling seamless network level mobility in telecommunications networks.

BACKGROUND OF THE INVENTION

Mobile Internet access is becoming increasingly more popular in concert with improvements in wireless technologies and reduced costs for those technologies. Early mobile Internet access was limited primarily to uses such as sending email or checking stock quotes. These uses typically entail relatively short transmission sessions that are less sensitive to minor disruptions. As the popularity and technologies of mobile Internet access improve, so will the demands of the end users. As they stay connected for longer periods, use many different applications, and hop across different access technologies and administrative domains during an ongoing session, end users will demand continuity of their Internet applications. In short, they will desire essentially seamless mobile Internet service from the end user perspective.

Providing seamless services, therefore, may be a critical issue for the success of wireless networks. In the context of providing Internet access services supported by the Internet protocol (IP), seamless IP-layer connectivity is important for ensuring that a mobile terminal can hand off to a new access router with minimal disruption to the mobile terminal's Internet connectivity. There are several known approaches to providing such IP connectivity. One approach, known as mobile IP, describes a mechanism that allows packets to be routed through the Internet to a new access router when the mobile terminal changes its point of Internet access from a current access router to a new access router. This mechanism is described in Internet Engineering Task Force (IETF) Request For Comments (RFC) number 3220 (October 1996) and draft-ietf-mobileip-ipv6-16.txt. According to this mechanism, after having established link-layer connectivity with the new access router, the mobile terminal typically engages in signaling the new access router in order to obtain its new care-of-address. When obtaining the new care-of-address, the mobile terminal has acquired IP-level connectivity with the new access router so that the mobile terminal can transmit and receive packets with the new access router. A fast handoff protocol enables forming the new care-of-address while the mobile terminal is still attached to the current access router. As soon as the mobile terminal acquires link-layer connectivity with the new access router, the mobile terminal can transmit and receive packets with the new access router.

Simply moving the mobile terminal's point of access to the Internet from the current access router to the new access router may not suffice if the packet session supporting the application requires additional features such as transport quality of service (QoS), security, and header compression. These features are part of the context for the packet session, which should be transferred to ensure seamless transfer of the mobile terminal's packet sessions to the new access router.

However, mobile applications, such as multimedia mobile Internet applications, typically require feature-rich IP-connectivity to the Internet. Even though a mobile terminal is able to exchange packets with the network without any disruption due to handoff, the mobile terminal may not be able to immediately execute an Internet application upon the completion of the handoff. This is indeed the case when the application uses certain application-specific functionality from the network. Consequently, service disruption may occur despite having seamless IP connectivity if the application-specific functionality is not relocated at the time of the mobile terminal's IP-level handoff. Appropriate mechanisms may be required to provision or re-provision the application-specific functionality in a new network domain after the handoff so that the application continues to operate seamlessly for the mobile terminal.

SUMMARY OF THE INVENTION

The present invention provides for relocation or provision of application-specific functionality required by Internet applications executing on a mobile terminal (mobile node) at the time of terminal's network layer handoff. Entities that may participate in this process of relocation or provision of application-specific functionalities may include access routers, gateway routers and the entities providing the application specific functionalities such as transcoding proxies, performance enhancing proxies (PEPs), security gateways, location servers etc. Application-specific functionality as used herein generally refers to functional requirements of an application for one or more sessions involving the application and may include requirements of the application or requirements of a session involving the application. Information about application-specific functionality is included in an application context. Thus, application context as used herein generally refers to information about functional requirements of at least one application involving at least one session (e.g. bandwidth requirements for a session, media format for a session, media formats acceptable for the application).

The relocation or provision of the application-specific functionalities with a network layer-level handoff (e.g. an IP-level handoff) enables the mobile terminal to seamlessly operate an application even in the light of network layer handoff. This is achieved by first registering the application context with a current access router, transferring the application context from one access router to another at the time of handoff, and taking appropriate steps to relocate or provision the application specific or session specific functionality. This is in contrast to requiring the mobile terminal and the source to perform an entire protocol exchange from scratch for the new access point.

In one embodiment of the invention, before a mobile terminal handoff, a mobile terminal constructs an application context for a session and registers the context with the current access router. The current access router informs a new access router about the application context for the session. Subsequently, the new access router evaluates the application context, and if necessary, discovers a network entity that can support the application. According to one aspect, the network entity may be a transcoder proxy server that receives data from the new access router, modifies the data, and returns the modified data to the new access router. According to another aspect, the network entity may receive data for the session from a gateway router that filters session data and forwards it to the network entity. The network entity subsequently modifies the data and returns the modified data to the new access router.

In other embodiments of the invention, computer-executable instructions for implementing the disclosed methods are stored on computer-readable media. Other features and advantages of the invention will become apparent with reference to the following detailed description and figures.

DETAILED DESCRIPTION OF THE INVENTION

Figure 1:
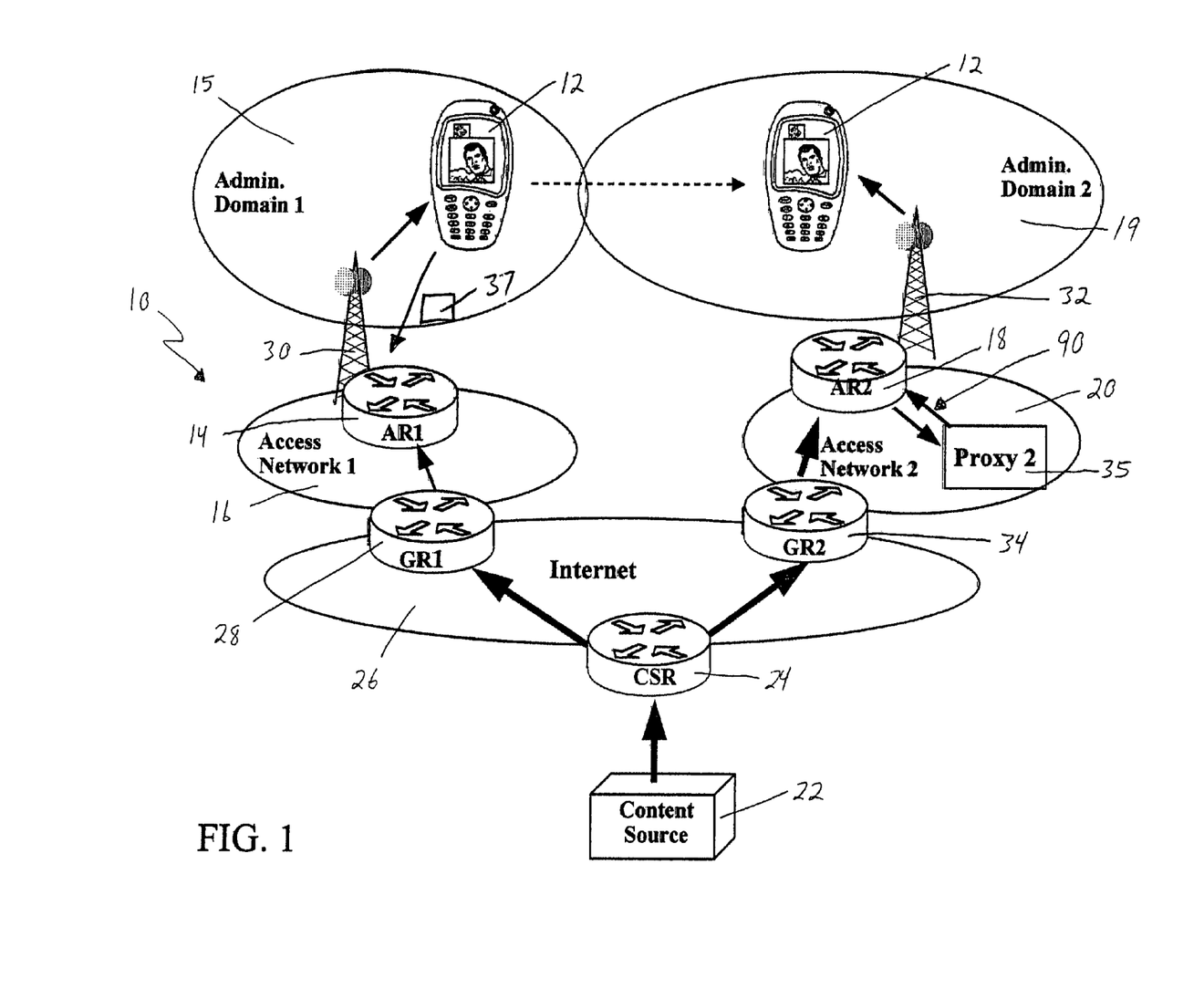
FIG. 1 shows an architecture that supports an application context transfer during an IP-level handoff of a mobile terminal according to one embodiment of the invention.

The invention may be embodied in various forms. Referring now to FIG. 1, an architecture 10 that supports application context transfer is shown for an Internet session undergoing IP-level handoff according to an embodiment of the invention. As shown, one embodiment of the architecture 10 generally includes a mobile terminal 12 within a current administrative domain 15, a current access router 14 in a current network 16, a new administrative domain 19, and a new access router 18 in a new access network 20. A session as used herein generally refers to a packet data stream between a mobile terminal 12 and a content source 22. A communication application is supported over such a packet session. Seamless transition of the session's path in the network as mobile terminal 12 moves from current administrative domain 15 to new administrative domain 19 may be provided by a procedure as supported by Mobile IP (Mobile IP Specification: Internet Engineering Task Force RFC 3220 or draft-ietf-mobileip-ipv6-16.txt) and fast handoff. We refer to this transition as IP-level handoff.

Before occurrence of the IP-level handoff, while mobile terminal (MT) 12 is situated in a serving area within current administrative domain 15 served by current access network 16, content source (CS) 22 may generate a packet data stream that is transmitted via a content source router 24 through a network 26 such as the Internet, to a gateway router 28 for current network 16. The data stream is subsequently routed through current network 16 to current access router 14 in communication with a base transceiver station (BTS) 30, and via a wireless channel (e.g. a wireless LAN in accordance with IEEE 802.11) to mobile terminal (MT) 12 (Mobile terminal 12 can be alternatively referred as a mobile node). Current access router 14 provides access to current network 16 for the current domain 15. In other embodiments, a plurality of access routers may support an administrative domain. Even though FIG. 1 depicts only one base transceiver station, a plurality of base transceiver stations typically support an administrative region. The packet data stream can support a variety of services to mobile terminal 105 such as a streaming video multicast service, in which the packet data stream corresponds to a video stream.

Because MT 12 is mobile, it can move into new administrative domain 19 supported by a new base transceiver station 32 and communicate with new access router 18. The new access router 18 is connected to new access network 20, which is connected with network 26 via a new gateway router 34. In accordance with seamless IP-level handoff, for example through Mobile IP, the packet data stream from CS 22 is routed via network 26 though gateway router 34, new access network 20, new access router 18, and BTS 32 to MT 12. The new path via new access network 20 for the packet data stream, however, may need to establish application specific service features before the session properly continues with MT 12. Without the transfer of application context information, this may require an entire protocol exchange being performed from scratch with CS 22 for new access network 20, which would not permit a substantially seamless transfer of an application session from the end user perspective. The present invention permits substantially seamless transfer of an application session by transferring the application context for the session. To assist with setting up application specific service features in support of the session, new access network 20 according to one embodiment includes a network entity, such as proxy transcoder server 35.

Figure 2:
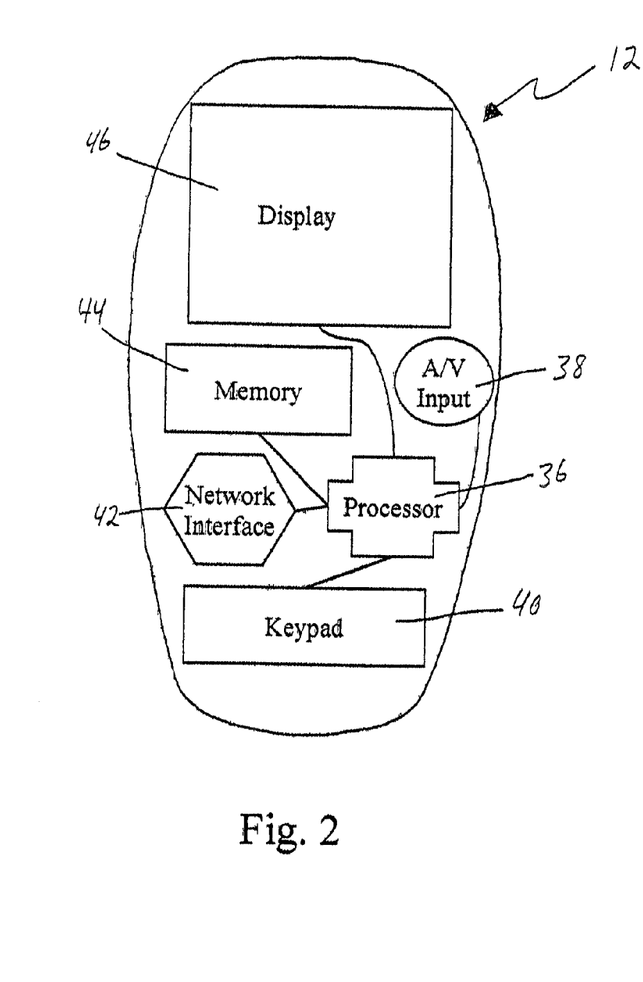
FIG. 2 shows a functional diagram of the mobile terminal of FIG. 1.
Figure 3:
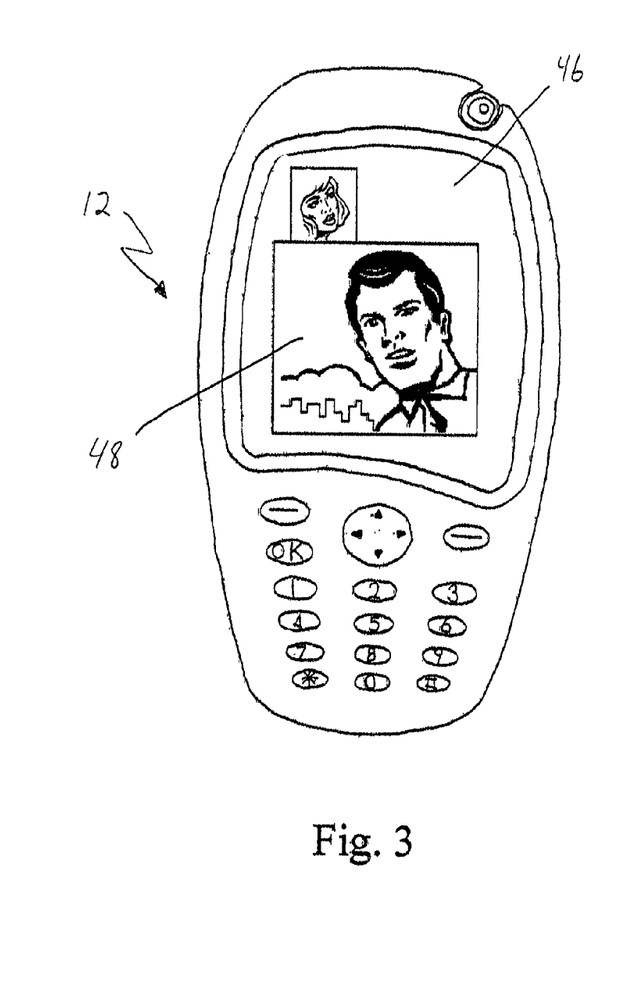
FIG. 3 shows a mobile terminal executing a sample video streaming application over a current IP session according to one aspect of the invention.
Figures 4, 5:
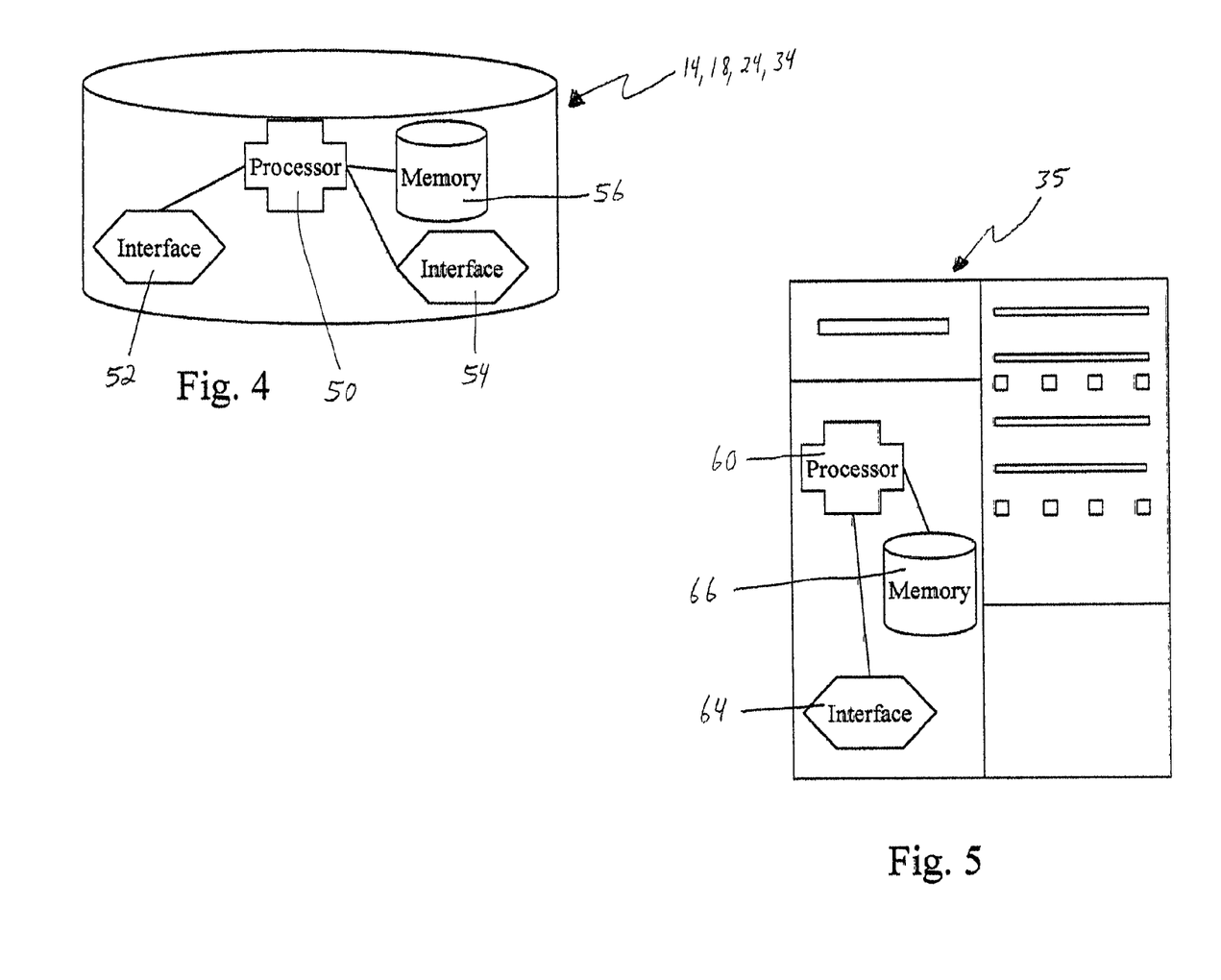
FIG. 4 shows a functional diagram of an access router in accordance with an embodiment of the invention.
FIG. 5 shows a functional diagram of a proxy server in accordance with an embodiment of the invention.

For describing application context transfer for the application executing on the mobile terminal and the associated session, suppose, for example that MT 12 includes a video application (not shown), which receives streaming audio and video content from content source 22. Referring now to FIG. 2, MT 12 in accordance with one embodiment generally includes a processor 36, and in communication with the processor, audio/video inputs 38, a keypad 40, a network interface 42, memory 44, and a display 46. The video application (not shown) is stored in memory 44 to provide processor 36 with instructions for engaging in a session with content source 22 via network interface 42. FIG. 3 generally shows operation of MT 12 for such a video session, showing video content 48 on display 46. As shown in FIG. 4, a router according to an embodiment for the invention, such as routers 14, 18, 28 and 34, generally includes a processor 50, which is in communication with a first interface 52, a second interface 54, and memory 56. As shown in FIG. 5, a network entity according to one embodiment of the invention, such as proxy server 35, generally includes a processor 60 in communication with at least one interface 64 and memory 66.

Figure 6:
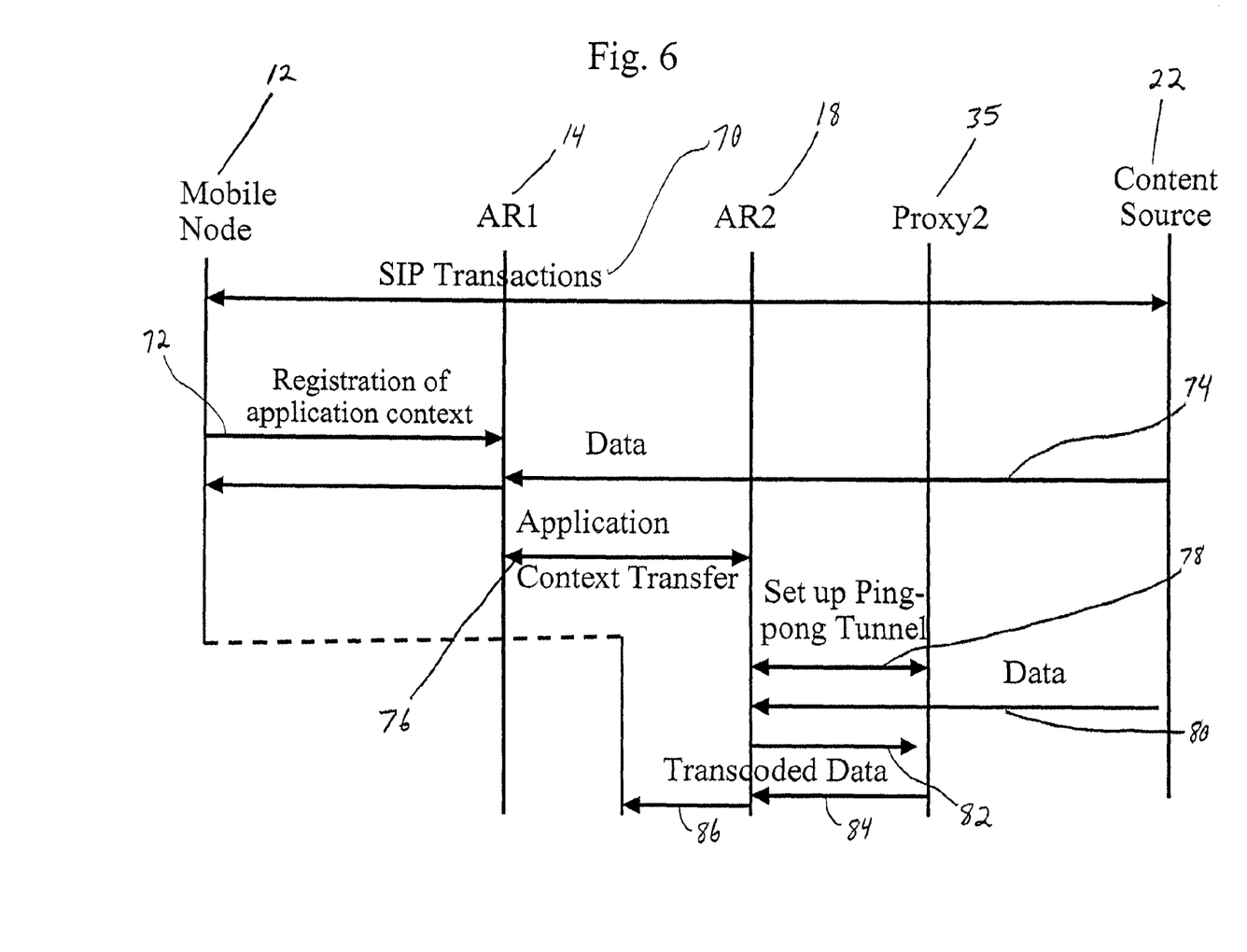
FIG. 6 shows a diagram of message flows between some components of the architecture of FIG. 1 for an application context transfer.

Suppose now that a user of MT 12 desires to receive video content such as a HBO movie or a NFL sports clip from the content source 22. Suppose further that the user receives such content while MT 12 is in communication with access network 16, and that access network 16 communicates with MT 12 via current domain 15, which is a high bandwidth wireless local area network (WLAN). Suppose also that CT 22 uses session description protocol (SDP) as defined in RFC 2327, April 1998, to provide descriptive information for the session via a session initiation protocol (SIP) INVITE message as defined in RFC 2543, March 1999. MT 12 responds with acknowledgements regarding descriptions that it can accept, which would be accurate for the WLAN capabilities of current domain 15 and access network 16. The descriptions may include, for example, the type of media (voice and video), media format (e.g. MPEG-4), bandwidth information, and Quality of Service (QoS) information. Referring to FIG. 6, which diagrams message flows according to an embodiment of the invention, these transmissions are shown as SIP transactions 70. Based on the response by MT 12, the video session will begin according to bandwidth and QoS parameters applicable for communication via current access network 16.

Suppose now that the user desires to move MT 12 from the current WLAN administrative domain 15 to a new administrative domain 19 in communication with new access router 18 and new access network 20. Suppose also that the bandwidth in new administrative domain 19 is less than the WLAN administrative domain. This would typically be the case for example if the new administrative domain happens to be the outdoor cellular coverage. Because the session was established with higher bandwidth capabilities, the session may be unable to continue uninterrupted in its current state as regards resolution, speed of video motion, size of displayed pictures, color combinations, clarity of audio etc. Some of these parameters need to be changed so that the video stream can fit in the new bandwidth constraints. To achieve this, prior to handoff from access router 14 to access router 18, MT 12 generates application context information 37 for the video session and registers 72 it with current access router 14. It may create the application context, for example, from information obtained in the SDP descriptive information in the SIP INVITE message from CS 22 and from MT 12's subsequent response. In order to register the application context, MT 12 formats the application context information into a pre-determined format that such access routers may accept. The pre-determined format may be according to a standard, such as one recommended by IETF. As an example, the standard format could be an object that could be used by an object-oriented application running on access routers 14, 18. Such object technologies, for example, may include Common Object Request Broker Architecture (CORBA), Distributed Component Object Model (DCOM), Simple Object Access Protocol (SOAP), Enterprise Java Beans (EJB), and Type Length Value (TLV).

After MT 12 creates and formats the application context for the video session, it registers 72 the context by transferring it to current access router 14, for example, via IP messaging. Such IP messaging may make use of protocols, for example, like Internet Control Message Protocol (ICMP), User Datagram Protocol (UDP), Transmission Control Protocol (TCP), and Stream Control Transmission Protocol (SCTP). According to one aspect of the invention, the transfer of application context to current access router 14 occurs along with a handoff trigger message from MT 12, such as an indication of a reduction in signal strength. According to other aspects, the application context may be transferred at the beginning of the session, at handoff, or almost any other time therebetween. As shown in FIG. 6, registration 72 may occur at the beginning of the session prior to CS 22 sending 74 data to MT 12. Further, the application context may be periodically updated, such as when changes occur to sessions. Although discussed in combination with a video call scenario, the application context may include information about various types of applications and sessions and about multiple concurrent sessions and applications for MT 12.

As diagrammed in FIG. 6, after MT 12 transmits the application context to current access router 14, current access router 14 receives the application context and transmits 76 the application context to new access router 18. The timing of the transfer between access routers 14 and 18 may vary. For example, if MT 12 registers the application context at the beginning of the session, access router 14 may simply store the application context in memory 56 until it anticipates a handoff. It may anticipate a handoff based on the reception of a handoff trigger from MT 12, or based on other information, such as by GPS tracking information for MT 12. Conversely, if MT 12 registers the application context along with a handoff trigger, access router 18 may immediately transfer the associated application context for MT 12 and its current sessions to new access router 18. Transfer 76 of the application context for MT 12 and its sessions from router 14 to router 18 may occur via Internet communications using IP messaging.

Upon reception of the application context, new access router 18 evaluates the application context to determine whether steps are necessary to introduce application-specific functionality for the session. It may do this by comparing the parameters contained in the application context with corresponding capabilities for transmissions via access network 20 and communication capabilities for domain 19. For example, in the video call scenario, access router 18 may evaluate the application context and determine that the bandwidth for communicating with MT 12 in new administrative domain 19 is less than the established session, as originally supported by broadband WLAN administrative domain 15. As such, access router 18, in accordance with program instructions stored in memory 56, may establish a relationship with network entity 35 to provide necessary application-specific functionality for the session. In the case of the video call session, network entity 35 may be a transcoding proxy server 35 that transforms the high bandwidth video into low bandwidth video appropriate for transmission over the new wireless link.

According to another aspect of the invention, current access router 18 may also initiate actions for providing application-specific functionality for the session after handoff to the new access router 18. This may be based on information about new access network 20 and new administrative domain 19 gained by protocols such as Candidate Access Router (CAR) Discovery Protocol (see draft-ietf-cardiscovery-issues-02.txt). As such, current access router 16 may make certain decisions prior to handoff for supporting the session after handoff, like determining transcoding requirements.

Referring now to FIGS. 1, 5, and 6, transcoding proxy server 35 includes a processor 60 connected to at least one communication interface 62 and memory 64. According to instructions stored in memory 64, the processor may modify messages received via interface 62 as necessary to provide application-specific functionality for the session. For example, it may change the resolution, image size, color gradation, speed of motion or even coding format of the original content so that the bandwidth of the transformed content is suitable for the new administrative domain 19. In the video streaming scenario, it may modify streaming datagrams using compression technology known as MPEG-4 for Moving Pictures Experts Group version 4 into MPEG layer 2 (MPEG-2) datagrams. The streaming MPEG-4 datagrams, which typically include multiple streams and two-dimensional and three-dimensional scene components, may work well in a broadband environment like the WLAN of administrative domain 15. They may not, however, be appropriate for perhaps a slower connection, such as domain 19. By transcoding the datagrams into MPEG-2 datagrams, which are more highly compressed into frames according to layer two levels, the video streaming may be seamlessly supported via new access router 18 and domain 19. The quality of the video content display 48 may degrade according to the MPEG-2 format, but the video streaming will continue seamlessly. In another embodiment, the coding format may still be maintained as MPEG-4, however quality of video may be reduced in the interest of supporting the content over the low bandwidth link.

When new access router 18 receives the application context, it may establish a relationship with network entity 35 in various ways. According to one embodiment of the invention, new access router may establish 78 a ping-pong tunnel 90 with transcoder 35. Ping-pong tunnel 90 is generally a two-way virtual path between new access router 18 and transcoder 35. As a virtual path, transmissions between new access router 18 and transcoder 35 are preferably encapsulated for tunneling (see e.g. RFC 2004, Minimal Encapsulation; and RFC 1701, GRE Tunneling). As such, new access router 18 may send packets to transcoder 35 over the tunnel, and transcoder 35 may return packets containing modified or transcoded content to new access router 18 over the tunnel. For example, as new access router 18 receives 80 datagrams from CS 22 for the video call (which contain high quality video data in MPEG-4 format as initially established) it forwards 82 them to transcoder 35 via ping-pong tunnel 90. Transcoder 35 modifies the MPEG-4 video data contained in datagrams into MPEG-2 video data (or MPEG-4 video data of reduced quality), encapsulates the transcoded video data into new datagrams and returns 84 them to new access router 18. New access router 18 then transmits 86 the datagrams containing this transcoded video content to MT 12. Accordingly, the content stream from CS 22 is not interrupted as MT 12 moves from domain 15 to new domain 19, and MT 12 is able to receive video content at a feasible rate to seamlessly maintain the video call.

The ping-pong tunnel 90 also supports transcoding of messages in the reverse direction. Although not necessary in the video streaming scenario, MPEG-2 datagrams sent from MT 12 could also be sent to transcoder 35 via ping-pong tunnel 90. Transcoder 35 may subsequently change the datagrams into an MPEG-4 format compatible with CS 22. This option is perhaps more practical for other scenarios where transcoder 35 changes other features of the datagrams, such as security features or QoS features. One such example is TCP PEP (e.g. see RFC 3135), which needs to be present in the packet paths in both directions, i.e., in forward data path from CS 22 to MT 12 as well as in reverse acknowledgement path from MT 12 to CS 22.

Application context transfer according to the present invention is versatile and may be applied to almost any type of application or session. For example, according to one embodiment of the invention, the application context may include information extracted from Hypertext Transfer Protocol (HTTP) messages. Suppose, for example, that a user in current administrative domain 15 is using MT 12 to surf the Internet. Suppose also that the user has downloaded a web page (not shown) that starts a certain application (not shown) on MT 12, such as a Hypertext Markup Language (HTML) document. Other examples, among many, could include Extensible Markup Language (XML) documents or Synchronous Multimedia Integration Language (SMIL) documents. The information required to construct the application context could be included in such web pages sent by CS 22. For example, a certain application may require the location server in the access network to provide the location of MT 12 to CS 22. This enables CS 22 to tailor the content according to the location of MT 12. The need for location service for the application can be described by including an object in the downloaded web page to that effect. Here location service is the application-specific functionality provided by access network.

In some scenarios, MT 12 could decide by itself if the application-specific functionality is to be used from the network, and then it could construct the application context based on this information. For example, we can consider TCP performance enhancing proxies (PEPs) as described in RFC 3135 as the application-specific functionality requested by the MT 12. MT 12 may register application context with access router 14 expressing need for TCP PEP. When MT 12 is attached to access network 116, PEP may not be needed as the WLAN link has high bandwidth and low error rate. However, when handed off to access router 118, TCP PEP may need to be introduced in the end-to-end data path to cater to low bandwidth and high error rate of wireless link in administrative domain 119.

Figure 7:
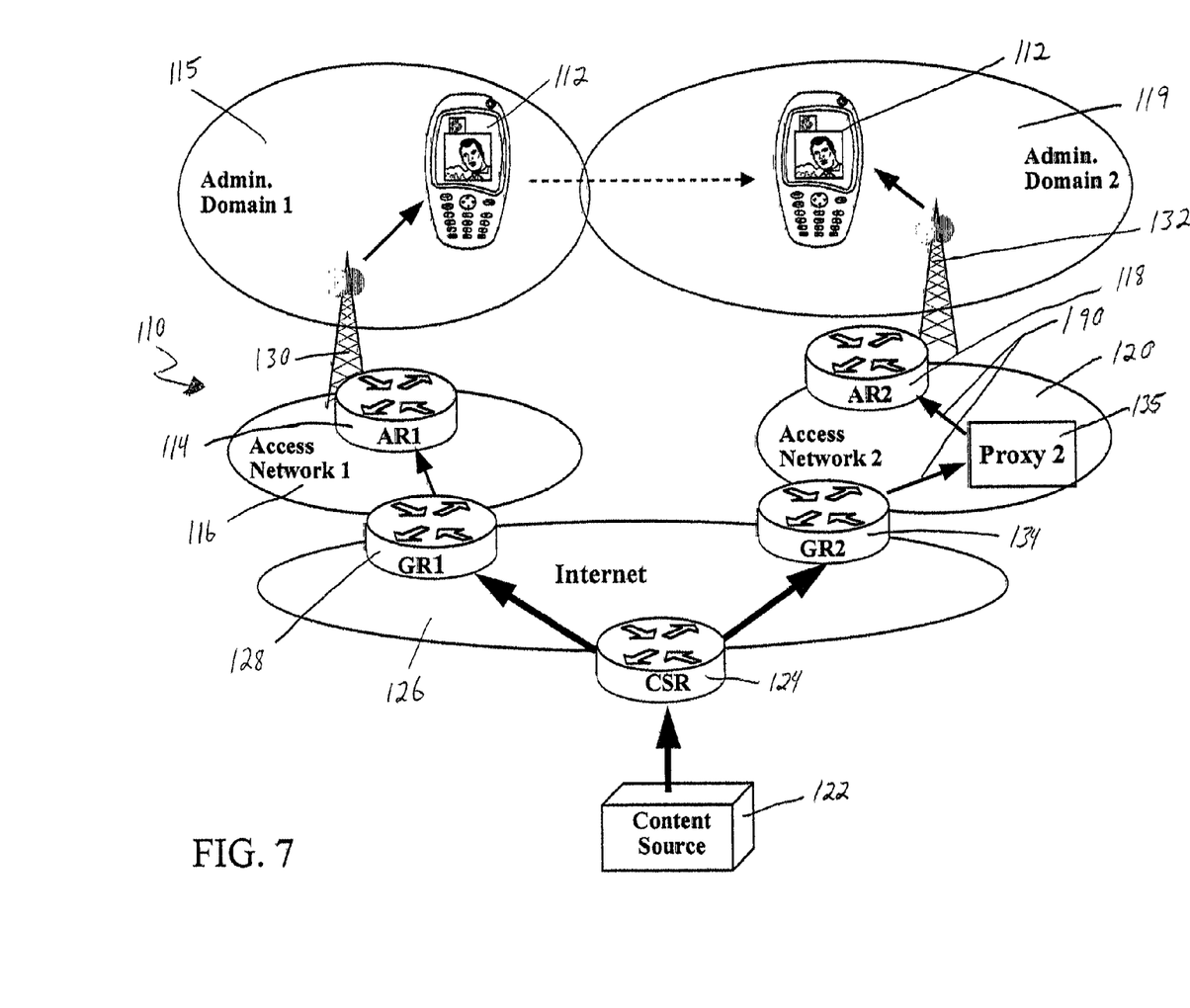
FIG. 7 shows another architecture that supports an application context transfer during an IP-level handoff of a mobile terminal according to another embodiment of the invention.
Figure 8:
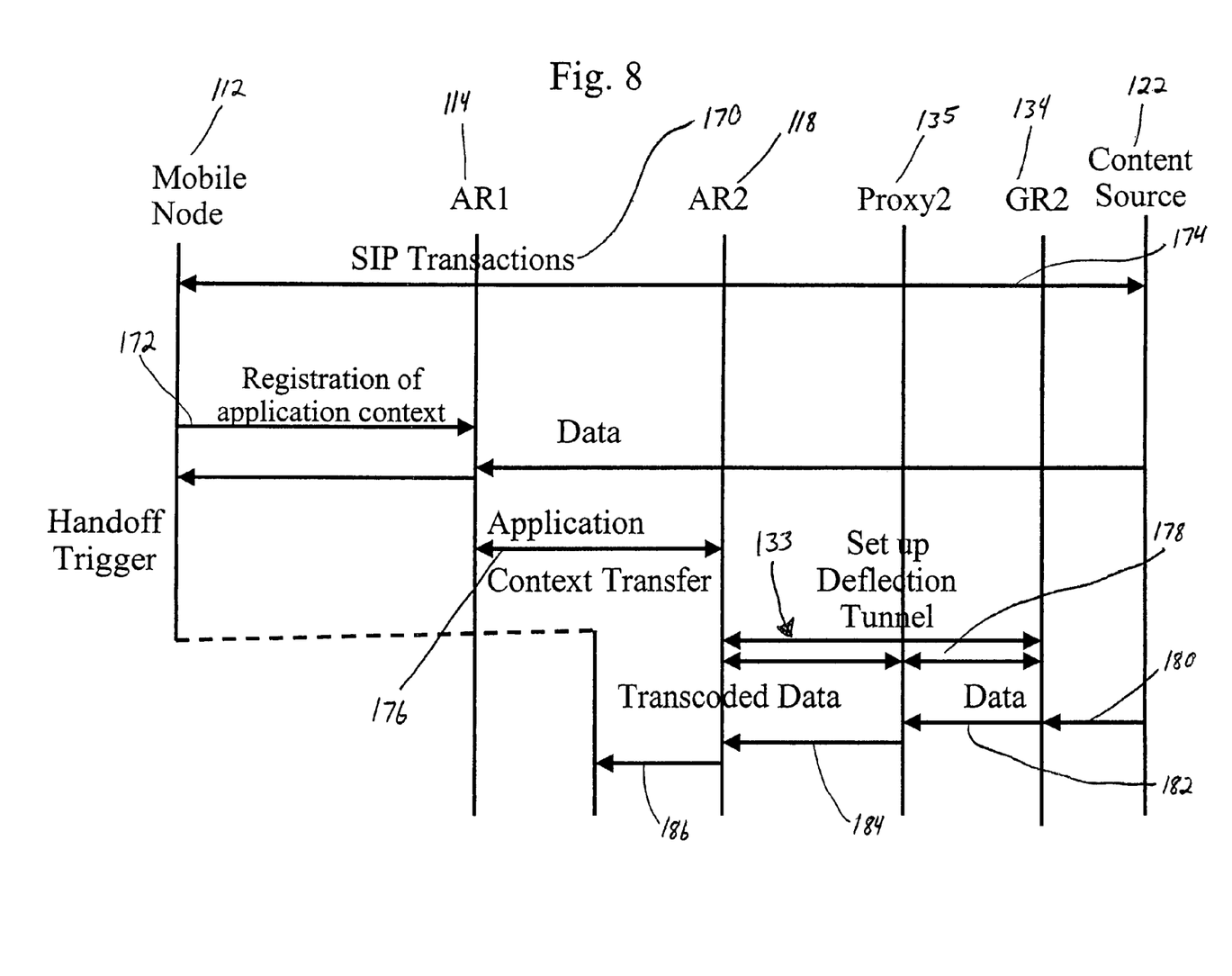
FIG. 8 shows a diagram of message flows between some components of the architecture of FIG. 7 for an application context transfer.

Referring now to FIGS. 7 and 8, architecture 110 that supports application context transfer for an Internet session during IP-level handoff of a mobile terminal in accordance with another embodiment of the invention is shown. Architecture 110 and the accompanying embodiment of the present invention, wherein like numerals refer to like features, generally includes the same aspects as previously discussed except as explained below. In keeping with the video streaming scenario, suppose that mobile terminal 112 moves from a current administrative domain 115, where a video streaming session began using MEP-4 parameters and broadband WLAN communications with access router 114, to new administrative domain 119. Suppose further that according to the steps shown in FIG. 8, access router 114 is in the process of transferring 176 the application context for the video session to new access router 118.

When new access router 118 receives the application context, it evaluates the application context to determine what steps are necessary to provide application functionality for the session, which may include establishing a relationship with transcoder 135. According to one embodiment of the invention, new access router may establish 178 a deflection tunnel 190 from gateway router 134 via transcoder 135. Deflection tunnel 190 is generally a virtual path between a gateway router 134 and new access router 118 via proxy transcoder server 135. Gateway router 134 as used herein generally includes a router that can provide filtering functions. It may be a primary path between access network 120 and other networks, such as Internet 126. It could also be one of many routers along a pathway that packets in the video session pass, which may be tasked with filtering and tunneling packets for the session.

According to instructions stored in memory 56 of access router 118, router 118 communicates with gateway router 134 and transcoder proxy 135, such as through IP messaging 133, to establish deflection tunnel 190. Further, gateway router 134 and transcoder proxy 135 may also communicate to establish portions of deflection tunnel 190. Once set up, gateway router 134 filters packets for the session and forwards them to proxy server 135 via a virtual path. The virtual path, for example, may include encapsulating session packets for routing to proxy server 135 as is known for tunneling techniques. Once packets are received and de-encapsulated by transcoder proxy 135, proxy 135 modifies the packets as necessary according to instructions from new access router 118 in concert with the application context of the session. Thus, transcoder proxy 135 transcodes data for the session to provide seamless application functionality for the session. After transcoding packets, proxy 135 encapsulates and forwards the packets to new access router 118, which de-encapsulates the transcoded packets and forwards them to MT 112.

For example, according to the video streaming scenario, gateway router 134 receives 180 datagrams from CS 22 for the video call, which as initially established contain video data encoded in MPEG-4 format. Gateway router 134 subsequently filters the datagrams for the session, encapsulates them, and forwards them to transcoder proxy 135. Transcoder 135 de-encapsulates the datagrams and modifies the MPEG-4 video data into MPEG-2 video data or maintains MPEG-4 coding format but reduces the quality of video content. It subsequently encapsulates the transcoded content into new datagrams and forwards 184 them to new access router 118. New access router 118 then de-encapsulates the datagrams containing transcoded content and transmits 186 them to MT 112. Accordingly, the content stream from CS 122 is not interrupted as MT 112 moves from domain 115 to new domain 119, and MT 112 is able to receive datagrams containing transcoded content at a feasible rate to seamlessly maintain the video call.

The deflection tunnel 190 further supports transcoding of messages in the reverse direction. Although not necessary in the video call scenario, MPEG-2 datagrams sent from MT 112 could also be sent to transcoder 135 via deflection tunnel 190. Transcoder 135 may subsequently change the datagrams into an MPEG-4 format compatible with CS 122. This option is perhaps more practical for other scenarios where transcoder 135 changes other features of the datagrams, such as security features or QoS features. One such example is TCP PEP, which needs to be present in the packet paths in both directions, i.e., in forward data path as well as acknowledgement path.

Figure 9:
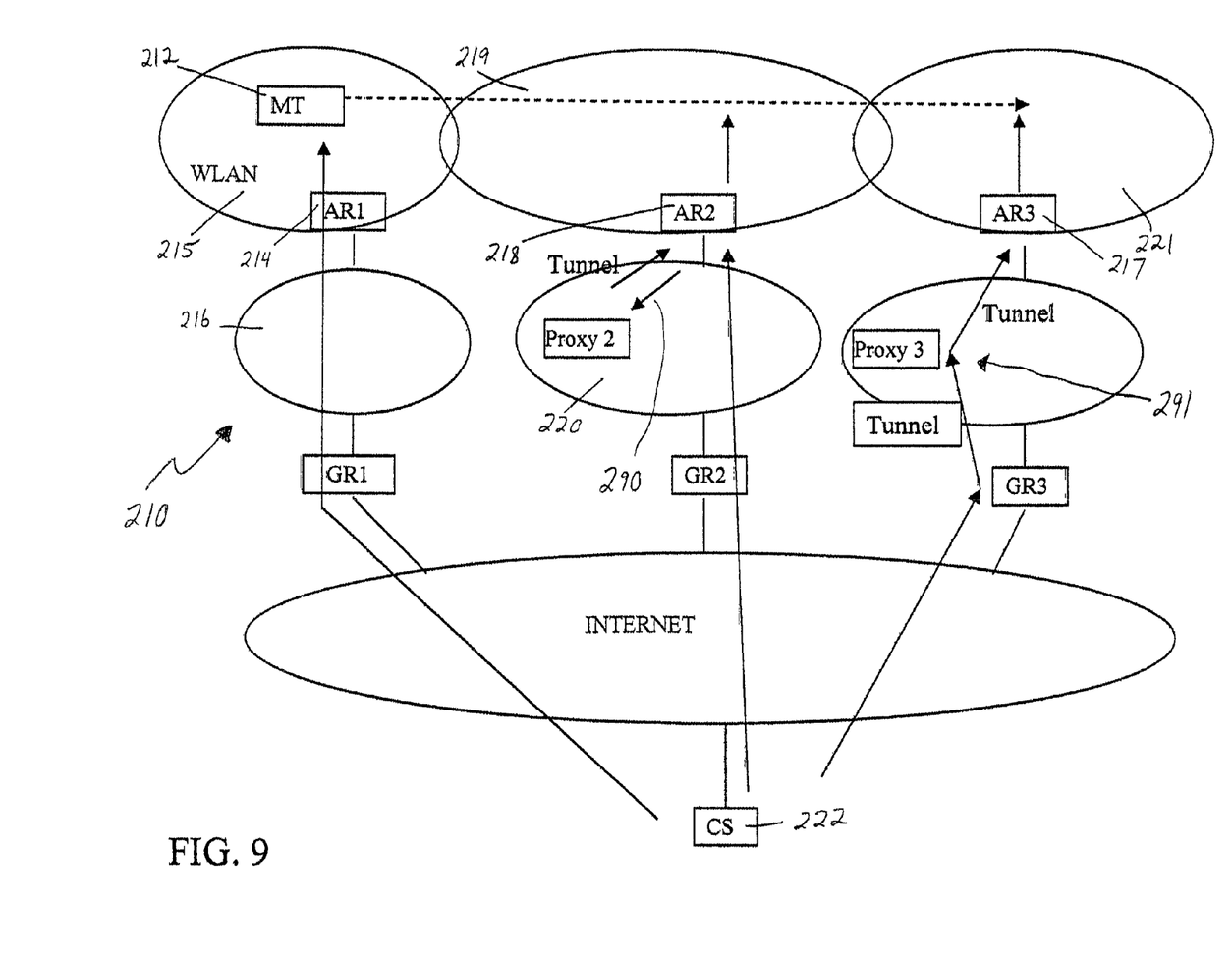
FIG. 9 shows a further architecture that supports an application context transfer during an IP-level handoff of a mobile terminal according to a further embodiment of the invention, and also shows data paths from a content source to the mobile terminal for different locations of the mobile terminal.

Referring now to FIG. 9, architecture 210 is shown that supports application context transfer for an Internet session during IP-level handoff of a mobile terminal according to a further embodiment of the invention. Architecture 210 and the accompanying embodiment of the present invention, wherein like numerals refer to like features, generally includes the same aspects as previously discussed except as explained below. Generally, architecture 210 includes embodiments of the ping-pong tunnel 90 and the deflection tunnel 190. In keeping with the video streaming scenario, suppose that mobile terminal 112 moves from a current administrative domain 215, where a video streaming session began using MEP-4 parameters and broadband WLAN communications with access router 214, to new administrative domain 219, and eventually to another administrative domain 221. As MT 312 moves between administrative domains, the application context for the session is transferred initially from access router 214 to access router 218, and then from access router 218 to another access router 217 for domain 221. After receiving the application context, access router 218 evaluates the application context and establishes a ping-pong tunnel 290 to provide application-specific functionality for the session. In contrast, after receiving the application context, access router 217 establishes a deflection tunnel 291 to support application functionality. Both ping-pong tunnel 290 and deflection tunnel 291 are not exclusive options for supporting application functionality, and either or both may be used by same or different access networks.

While the present invention has been described in connection with the illustrated embodiments, it will appreciated and understood that modifications may be made without departing from the true spirit and scope of the invention. In particular, the invention applies to any mobile terminal and architecture for providing service provisioning through application context transfer.

We claim:

1. A mobile terminal adapted to participate in transferring an application context to enable a substantially seamless network level handoff of a session involving an application executing on the mobile terminal across access networks, the terminal comprising:
    a communications interface; and
    a processor communicating through the communications interface, the processor configured to perform:
        establishing a first connection with a first access router in communication with the mobile terminal;
        establishing the session with a content source via a first path through the first access router;
        constructing the application context for the session;
        registering the application context with the first access router;
        establishing a connection with a second access router;
        maintaining the session with the content source via a second path through the second access router, the second path excluding the first access router; and
        sending a handoff trigger to the first access router to transfer the application context to the second access router.

2. The mobile terminal of claim 1, wherein the application context comprises information about a plurality of sessions involving the application.

3. The mobile terminal of claim 1, wherein the application comprises a plurality of applications executing on the mobile terminal and the application context comprises information about a plurality of sessions involving the plurality of applications.

4. The mobile terminal of claim 1, wherein the application context comprises information about the session.

5. The mobile terminal of claim 4, wherein the application context information comprises Session Description Protocol (SDP) information.

6. The mobile terminal of claim 4, wherein the application context information comprises information selected from the group consisting of media coding information, Quality of Service (QoS), and bandwidth information.

7. The mobile terminal of claim 6, wherein the media coding information is selected from the group consisting of MPEG-2 and MPEG-4.

8. The mobile terminal of claim 4, wherein the application context information comprises information extracted from a downloaded Hypertext Transfer Protocol (HTTP) web page associated with the session.

9. The mobile terminal of claim 8, wherein the extracted information comprises data within an object in the downloaded web page.

10. The mobile terminal of claim 8, wherein information to construct the application context is included in the downloaded web page using a markup language.

11. The mobile terminal of claim 10, wherein the markup language is selected from the group consisting of Hypertext Markup Language (HTML), Extensible Markup Language (XML), and Synchronous Multimedia Integration Language (SMIL).

12. The mobile terminal of claim 1, wherein the step of registering the application context with the first access router comprises the step of formatting the application context into a format for transmission to the first access router.

13. The mobile terminal of claim 12, wherein the format for the application context comprises the format of an object of an object-oriented computer program.

14. The mobile terminal of claim 13, wherein the object conforms with an object model selected from the group consisting of Common Object Request Broker Architecture (CORBA), Distributed Component Object Model (DCOM), Simple Object Access Protocol (SOAP), Enterprise Java Beans (EJB), and Type Length Value (TLV) format.

15. The mobile terminal of claim 1, wherein the step of registering the application context with the first access router comprises the step of transmitting the application context to the first access router.

16. The mobile terminal of claim 15, wherein the transmission of application context is performed using a protocol for transferring messages between nodes in an Internet protocol (IP) network.

17. The mobile terminal of claim 16, wherein the protocol is selected from the group consisting of Internet Control Message Protocol (ICMP), User Datagram Protocol (UDP), Transmission Control Protocol (TCP), and Stream Control Transmission Protocol (SCTP).

18. The mobile terminal of claim 1, wherein the session comprises a streaming video session, the streaming video session comprising data having a bandwidth and coding format, the application context comprising information about the session, the information comprising the bandwidth and coding format, the processor configured to perform further steps comprising:
   formatting the application context into a format for transmission to the first access router
   prior to sending the handoff trigger to the first access router to transfer the application context to the second access router.

19. An access router adapted to participate in transferring an application context of a session between a mobile terminal and a content source to enable a substantially seamless network level handoff of the session across access networks, the session involving an application executing on the mobile terminal, the access router comprising:
   a first communications interface that communicates with the mobile terminal;
   a second interface in communication with another access router; and
   a processor in communication with the first and second interfaces, the processor configured to perform the steps of:
   receiving an application context from the mobile terminal in communication with the first communications interface, the application context comprising information about the session, the session including a route through the access router;
   transmitting the application context to the another access router via the second interface in anticipation of an impending handoff of the mobile terminal; and
   exiting the session when the mobile terminal completes a handoff to the another access router, wherein the anticipation of an impending handoff comprises reception of a handoff trigger from the mobile terminal.

20. A method for transferring an application context for a session between a content source and a mobile terminal involving an application executing on the mobile terminal to enable a substantially seamless network level handoff of the session, the method comprising:
   receiving the application context at a current access router of a first network in communication with the mobile terminal;
   receiving a handoff trigger via the first communications interface to transfer the application context to another access router;
   transmitting the application context to the another access router in response to receiving the handoff trigger; and
   exiting the session when the mobile terminal completes a handoff to the another access router.

* * * * *

UNITED STATES PATENT AND TRADEMARK OFFICE
CERTIFICATE OF CORRECTION

PATENT NO. : 7,908,378 B2  
APPLICATION NO. : 10/137340  
DATED : March 15, 2011  
INVENTOR(S) : Trossen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2628 days.

Signed and Sealed this
Sixteenth Day of August, 2011

David J. Kappos
*Director of the United States Patent and Trademark Office*